United States Patent [19]

Manders

[11] 4,372,848
[45] Feb. 8, 1983

[54] OIL FILTER APPARATUS

[76] Inventor: Logan J. Manders, P.O. Box 284, Delmar, Del. 19940

[21] Appl. No.: 268,524

[22] Filed: May 28, 1981

[51] Int. Cl.$^3$ .............................................. B01D 27/10
[52] U.S. Cl. .................................... 210/90; 210/133; 210/168
[58] Field of Search .................. 210/90, 130, 133, 168

[56] References Cited

U.S. PATENT DOCUMENTS

| 2,544,269 | 3/1951 | Le Clair | 210/133 |
| 4,142,973 | 3/1979 | Kachman | 210/90 |

*Primary Examiner*—John Adee
*Attorney, Agent, or Firm*—John J. Byrne

[57] ABSTRACT

An oil filter apparatus including a disc element (16) operable to be releasably mounted between a conventional oil filter cannister (14) and a machine (10) to be lubricated. The disc element has generally mutually parallel and opposing end surfaces (50, 52) operable to be mounted between the machine and the oil filter and abut against and sealingly engage with compatible surfaces on both members. The disc element (16) includes a first disc passage (56) extending between the opposing surfaces of the disc and being in fluid communication between a first oil passage (3) carrying oil under pressure within the machine to be lubricated and the inlet side of an oil filter element. A second disc passage (58) extends between the opposite surfaces of the disc and is in fluid communication with an oil outlet port (40) of the filter element and a second oil passage (42) of the machine downstream of the first oil passage. A bypass passage (60) extends within the disc element and communicates with the first and second disc passages to permit oil to bypass the oil filter cannister. A normally closed check valve (70) is positioned within the bypass passage (60) and has an upstream side in fluid communication with the first disc passage (56) and a downstream side in fluid communication with the second disc passage (58). An electrical contact member (100) is biased against the check valve (70) and forms a part of a transistized switching circuit (84) operable to actuate a warning light (88), buzzer, etc. when system oil bypasses the oil filter through the disc element.

11 Claims, 6 Drawing Figures

OIL FILTER APPARATUS

BACKGROUND OF THE INVENTION

This invention relates to a novel oil filter apparatus. More particularly the invention comprises an electronic apparatus for monitoring and signaling the condition of an oil filter operable to remove contaminates from engine lubricating oils.

Internal combustion engines, and the like, having a large number of relative moving parts, are continuously lubricated by an associated lubrication system. The lubrication system typically includes an oil sump from which oil is pumped in a fluidic loop or splashed around and over moving engine parts such as valves, piston rods, etc. In order to eliminate abrasives which become suspended within the lubrication system the oil is continuously pumped through an oil filter mounted in series within the oil loop. If contaminates can be reliably removed it becomes unnecessary to change the oil since the oil per se does not "wear out" but rather becomes contaminated with impurities.

It is critical to maintain lubricating oils clean when lubricating expensive machinery such as internal combustion machines. The prior art teaches many variations in replaceable filters for such purposes. It is difficult for the operator of machinery, however, to determine when a filter must be replaced. Therefore, manufacturers of such equipment typically recommend that filters should be replaced after "so many hours of operation" or "after so many miles traveled." These methods are imprecise and often lead to the retention of filters past their useful life with subsequent damage to an engine or the filters are replaced unnecessarily before replacement is required. As more expensive and sophisticated filtering equipment is utilized, and the price of lubricating oil increases, an incentive exists to extend the useful life of the filter while concomitantly accurately determining when a filter needs replacement.

Other workers in the field have developed systems for sensing the degree of resistance filtered oil encounters via its travel through a filter by sensing the difference in oil pressure between an inlet and outlet and, upon sensing a predetermined difference, activating an alarm for signaling the operator that the filter is clogged.

At least one previously known system is designed to signal actuation of an engine mounted bypass valve. In this regard the valve structure is placed in series with an engine battery and in parallel with an alarm. In the event the bypass valve and circuit are opened the battery will conduct through the alarm thus signaling opening of the bypass valve.

While such a system provides at least a degree of theoretical appeal one disadvantage is that alarm systems of this type require special fitting within an engine block and oil system. Additionally a potential for sparking exists within the oil system when the bypass electrical circuit is broken. Still further such bypass valves are subject to "chatter" during starting, etc. due to temporary high pressures within the system.

One system which advantageously obviates many of the disadvantages of previously known bypass systems is disclosed and claimed in my U.S. Pat. No. 4,246,109 issued Jan. 20, 1981. The disclosure of this patent is hereby incorporated by reference as though set forth at length.

A difficulty with my prior disclosed bypass system is that the bypass structure tends to be relatively expensive when compared with conventional filter elements. Moreover the inferior character of most filtering media and systems dictates frequent replacement.

The difficulties suggested in the preceding are not intended to be exhaustive, but rather are among many which may tend to reduce the effectiveness of prior oil filter methods and apparatus. Other noteworthy problems may also exist; however, those presented above should be sufficient to demonstrate that oil filter apparatus appearing in the past will admit to worthwhile improvement.

OBJECTS OF THE INVENTION

It is therefore, a general object of the invention to provide a novel oil filter apparatus which will obviate or minimize difficulties of the type previously described.

It is a primary object of the invention to provide a synergistic combination of a clogged filter signaling system which will enhance the useful life of a given quantity of oil and a mounting assembly which may be facilely fitted onto existing equipment to be lubricated.

It is another object of the invention to provide a novel oil filter system wherein a clogged condition of a filter medium will be reliably indicated while temporary surges in oil pressure due to cold start up and the like are not reported.

It is a further object of the invention to provide a novel oil filter apparatus wherein an electrical signal will be generated upon opening of a bypass valve within an oil filter system while minimizing the possibility of creating a spark within the lubrication system.

It is yet a further object of the invention to provide a novel oil filter apparatus which will signal a clogged oil filter condition by breaking an extremely low voltage connection.

It is yet another object of the invention to provide a novel oil filter apparatus which will accurately and reliably signal the opening of an oil bypass valve.

It is a further object of the invention to provide a novel oil filter apparatus which may be facilely installed on conventional machines operable to accept conventional oil filter cannisters.

BRIEF SUMMARY OF THE INVENTION

A preferred oil filter apparatus intended to achieve at least some of the foregoing objects comprises a disc element operable to be releasably mounted between a conventional oil filter cannister and a machine to be lubricated. The disc element has generally parallel and opposing end surfaces operable abuts against and sealingly engage with compatible surfaces on the machine and oil filter. The disc element includes a first disc passage extending between the opposing end surfaces of the disc and being in fluid communication between a first oil passage carrying oil under pressure within the machine to be lubricated and the inlet side of an oil filter element. A second disc passage extends between the opposing surfaces of the disc and being in fluid communication with an oil outlet port of the filter element and a second oil passage of the machine downstream of the first oil passage. A bypass passage extends within the disc element and communicates with the first and second disc passages to permit oil to bypass the oil filter cannister. A normally closed check valve is positioned within the bypass passage and has an upstream side in fluid communication with the first disc passage and a downstream side in fluid communication with the second disc passage. An electrical contact member is biased against the check valve and forms a part of a transistized switching circuit operable to actuate a warning light, buzzer, etc. when system oil bypasses the oil filter cannister within the disc element.

THE DRAWINGS

Other objects and advantages of the subject invention will become apparent from the following detailed description of a preferred embodiment thereof taken in conjunction with the accompanying drawings, wherein.

DETAILED DESCRIPTION

Context of the Invention

Figure 1:
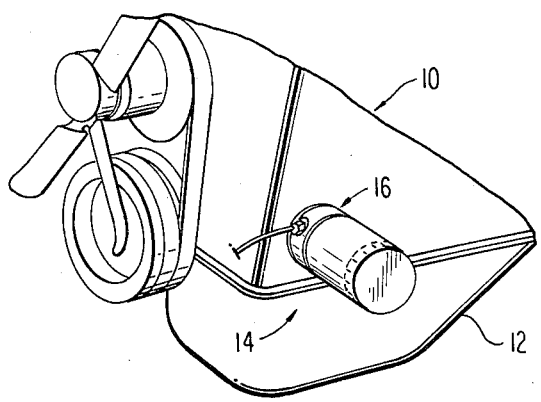
FIG. 1 is a partial axonometric view of one operative environment of the invention comprising an internal conbustion engine and a conventional cannister oil filter mounted upon the engine block.

Before presenting a detailed description of the subject oil filter apparatus, it may be worthwhile to outline the context of the the instant invention. In this connection FIG. 1 discloses a forward segment of a conventional internal combustion engine block 10. An oil pan 12 is mounted below the engine block and serves as a sump for a closed loop oil system formed by a pump and passages within the engine block, not shown. An oil filter 14 is mounted upon the engine block and in conventional systems abuts directly against an exterior surface of the engine block. The subject invention includes a disc element 16 which is facilely interposed between the engine block 10 and oil filter 14.

Figure 2:
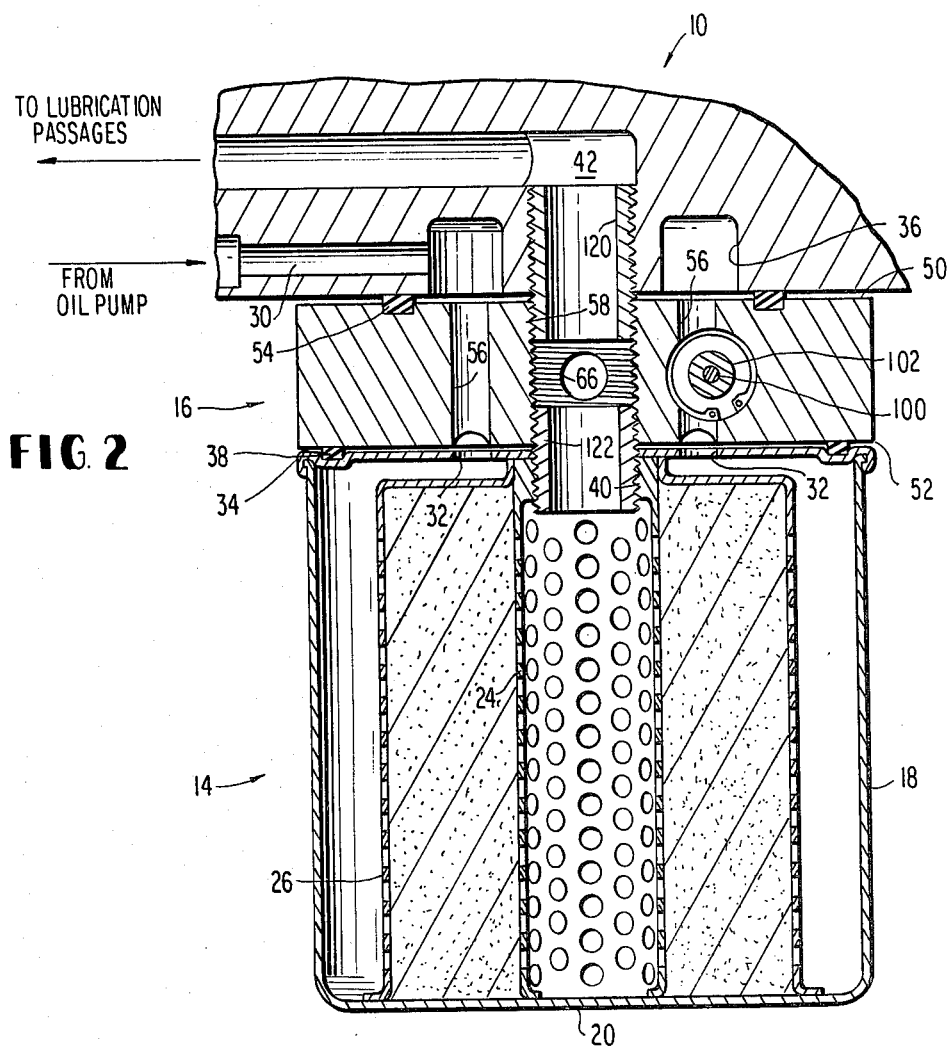
FIG. 2 is a side cross-sectional view of an oil cannister filter construction and an oil filter apparatus in accordance with the invention.

Referring now to FIG. 2 an illustrative example of the internal detail of the oil filter 14 is disclosed. In this connection a conventional screw on type oil filter includes a cylindrical outer cup or cannister 18 having a closed end 20 and a cylindrical filter media 22 concentrically mounted within the cannister. The filter element is enhoused within interior 24 and exterior 26 cylindrical sleeves which are perforated to permit oil to migrate through the filter media where impurities are entrapped.

Oil enters the filter 14 from a first oil passage 30 fashioned within the engine block. This passage carries oil under pressure from an oil pump, not shown. Oil enters the filter cannister 8 through a plurality of aperatures 32 fashioned through an end plate 34 thereof. The aperatures 32 typically lie upon an imaginary circle concentrically located upon the end plate and are in general alignment with an oil plenum 36 fashioned within the engine block. Accordingly oil to be filtered may be pumped into the oil filter 14 within the cannister and around the exterior of the filter media 22. In order to provide a seal between the oil filter 14 and the oil plenum 36 a circular resilient element 38 is mounted upon the end plate 34. This end seal normally abuts directly against a compatible surface on the engine block wall and effectively retains the pressurized oil within the oil filter.

After the oil passes through the filter media 22 it is collected within the central sleeve 24 and coaxially exits from the filter via an oil outlet port 40 into a second engine block oil passage 42 downstream of the first oil passage 30 within the closed loop oil system.

Oil Filter Apparatus

Figure 3:
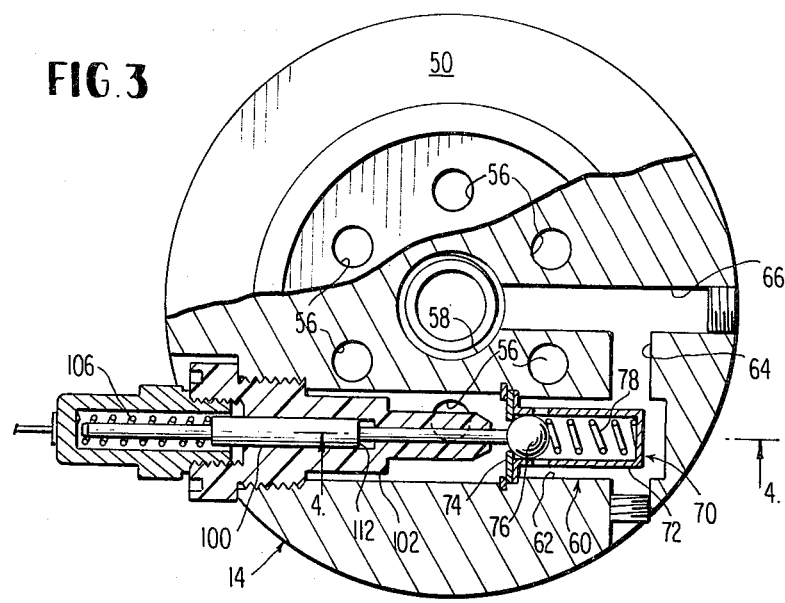
FIG. 3 is a cross-sectional plan view of the subject oil filter apparatus which discloses a check valve mounted within a cylindrical disc element.

As previously indicated the subject invention includes a disc element 16 having a generally cylindrical configuration, note FIG. 3, with mutually parallel opposing end surfaces 50 and 52. The end surface 50 is provided with a circular seal 54 such that the disc element may be operably abutted in a sealing posture between the engine block 10 and the end plate 34 of the oil cannister.

The disc element 16 is formed with at least one disc passage or bore 56 ending from one end surface 50 to the other 52. In a preferred embodiment a plurality of first disc passages or bores 56 extend in a mutually parallel array upon an imaginary circle and in a radial posture in substantial alignment with inlet passages 32 within an oil filter. These passages 56 are also in fluid communication with plenum 36 and the oil inlet passage 30 within the engine block.

The disc element 16 is further formed with a second disc passage 58 which axially extends through the disc element 16 from one end 50 to the other 52. This second passage 58 is in fluid communication with the outlet passage 58 is in fluid communication with the outlet 40 of the oil filter and a return or second oil passage 42 downstream of the first oil passage within the engine block.

A bypass passage 60 laterally extends into the disc element 16 and includes a first segment 62 which intersects at least one of the first disc passages 56. The bypass passage also includes a second 64 and third 66 segment which in combination with segment 62 form a passage which is in fluid communication between the at least one disc inlet bore 56 and the outlet or return bore 58 of the disc element. Accordingly the passage 60 is operable to permit oil from the engine inlet passage 30 to bypass the filter 14 through the disc element 16 and return to the second or return passage 42 within the engine lubrication system.

In order to prevent the previously described bypass of the oil filter 14 through passage 60 of the disc element 16 a check valve 70 is mounted within segment 62 of the bypass passage 60 in a normally closed posture between the oil inlet 56 and outlet 58.

The check valve 70 includes a cylindrical internal sleeve 72. A valve seat 74 is mounted at the base of the sleeve 72 and is configured to sealingly engage a valve body 76.

Figure 4:
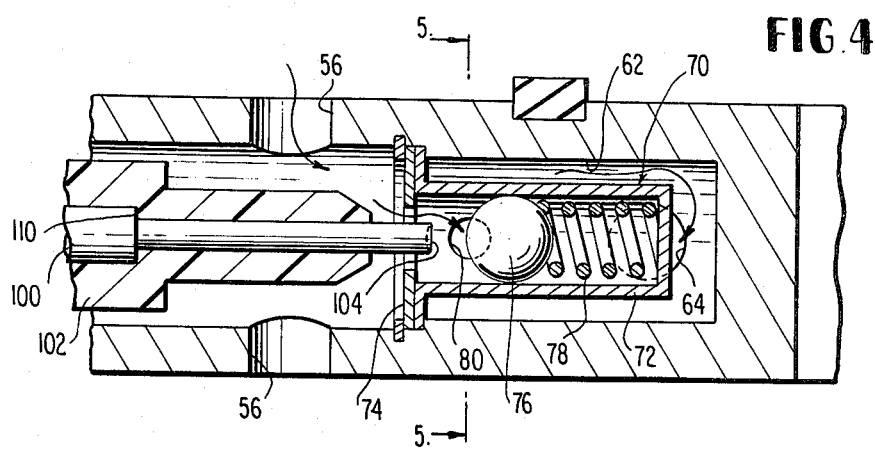
FIG. 4 is a cross-sectional view taken along section line 4—4 in FIG. 3.
Figure 5:
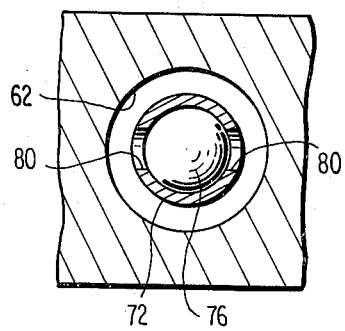
FIG. 5 is a cross-sectional view taken along section line 5—5 in FIG. 4.

The valve body 76, depicted in FIGS. 3-5, comprises, in a preferred embodiment, a metallic sphere. Other valve shapes, however, may be used such as cones, cylinders and the like as desired. The valve body 76 is normally biased against the valve seat 74 by a compression spring 78 which reacts against an end cap positioned across the sleeve 72.

A plurality of fluid ports 80, note particularly FIG. 5, extend radially through the sleeve 72 and are located in an axial posture downstream from the valve seat 74.

In the event pressure within the interior of the inlet passage 56 builds up beyond a predetermined acceptable level the lubricating oil will push the valve body 76 off of the seat 74 and slide the valve along sleeve 72 until the radial ports 80 are uncovered. Once the ports 80 are uncovered oil will flow through the check valve 70 and back into the lubrication system without being filtered.

Figure 6:
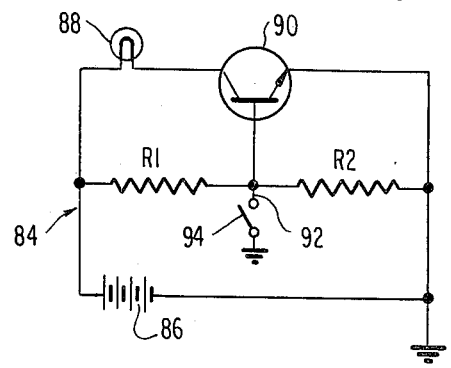
FIG. 6 is a diagram of an electrical circuit portion of the invention wherein a common base transistor circuit enables actuation of a signal lamp upon breaking a low voltage connection to ground.

In order to warn an operator of the actuation of check valve 70 an indicator assembly is connected to the check valve which will appraise the operator of a need to change the oil filter media. In this connection an electronic circuit 84, note FIG. 6, is provided which includes a source of voltage potential 86, such as a battery, a signal 88, such as a lamp, buzzer or other warning indicia, and a transistor switch 90.

The transistor switch preferably comprises an NPN common ground circuit wherein the lamp 88 is in series with a resistor R1 in the base/collector circuit and a second resistor R2 is in the base/emitter circuit. The base is connected to a common ground such as the engine block through an electrical conduit 92 and switch 94.

The switch 94 physically comprises an axially extending contact shaft 100 which is coaxially mounted within the bypass passage segment 62, note FIG. 3, and within a dielectric sleeve 102. A distal end surface 104 of the shaft 100 normally abuts against and establishes an electrical contact with the metallic valve body 76. The shaft 100 is biased from right to left, as viewed in FIG. 3, by a compression spring 106 having a normal spring force less than compression spring 78 such that the contact shaft 100 will be biased into engagement and electrical contact with the valve body 76 but without releasing the valve from its seat under normal operating conditions.

An internal shoulder 110 is fashioned within the dielectric sleeve 102 which cooperates with an external shoulder 112 on the axial shaft 100. Accordingly the contact shaft 100 operably rides against the valve 76 for a degree of axial travel until sufficient pressure is built up within the bypass passage to firmly release the valve and cause system oil to bypass the filter media. This lost motion or degree of free travel eliminates valve chatter and improper signally of a clogged filter during temporary or intermittent increases in system oil pressure.

Returning to FIG. 6 the resistances R1 and R2 are chosen in combination with the base/common ground connection to reverse bias the transistor 90. When the base to ground contact is broken by travel of the valve body away from the contact shaft 100 the transistor 90 is forward biased and permits current to pass which actuates the signal 88 indicating the fact that oil is bypassing the filter 14 and that a new filter is required.

The axial bore 58 of the disc element 16 is internally threaded and cooperates with externally threaded adaptors 120 and 122. Accordingly when a new filter is required the old filter 14 is removed by reverse rotating the filter cannister. A new filter cannister is then added and rotated into position in a conventional manner.

In describing an oil filter system in accordance with a preferred embodiment of the invention those skilled in the art will recognize several advantages which singularly distinguish the subject invention from previously known systems.

A particular advantage is the provision of a system which can be reliably utilized to maintain an oil lubrication system in a clean condition. Since the timing for filter replacement can be accurately determined with the subject system filters can be utilized to the maximum extent of their operating capacity while fully protecting the engine from solid abrasion contaminants.

Another particularly significant aspect of the invention is the compact character of the disc element which can be marketed separately and facilely mounted on existing equipment without requiring special retrofitting.

Another advantageous feature of the instant invention is the provision of a lost motion valve assembly wherein temporary increases in lubrication pressure will not signal a defective filter condition.

It is another aspect of the instant invention to provide a signaling system whereby breaking a milli or microvolt potential between a transistor base and common ground is achieved when the bypass valve is open. Such low potential significantly reduces the possibility of any arcing at the switch contact point during operation of the bypass valve.

In describing the invention, reference has been made to preferred embodiments. Those skilled in the art, however, and familiar with the disclosure of the subject invention, may recognize additions, deletions, modifications, substitutions and/or other changes which will fall within the purview of the invention as defined in the following claims.

I claim:

1. In an oil filter system, wherein system oil is pumped in a generally closed loop within a machine to be lubricated, an oil filter releasably mounted upon the machine said oil filter comprising a generally closed oil cannister having at least one oil inlet port fashioned through one end thereof and at least one oil outlet port fashioned through the same end thereof and an oil filter media mounted within the cannister such that system oil may be pumped from a first oil passage within the machine to be lubricated into the cannister via the at least one oil inlet port, through the oil filter media to filter the oil, out of the oil cannister and back into the machine via the at least one oil outlet port in the oil cannister and a second oil passage within the machine to be lubricated downstream of the first oil passage, the improvement comprising:

a disc element operable to be releasably mounted between the oil filter and the machine to be lubricated, said disc element having generally mutually parallel and opposing end surfaces and being operable to abut against and sealingly engage with compatible surfaces on the machine to be lubricated and the one end of the oil cannister respectively;

first disc passage means extending through said disc element from one of said opposing end surfaces to the other and in fluid communication at one end with said at least one oil inlet port into the oil cannister and in fluid communication at the other end with the oil passage within the machine to be lubricated;

second disc passage means extending through said disc element from one of said opposing end surfaces to the other and in fluid communication at one end with said at least one oil outlet port from the oil cannister and in fluid communication at the other end with the second oil passage downstream of the first oil passage, within the machine to be lubricated;

bypass passage means fashioned within said disc element and communicating said first disc passage means and said second disc passage means for permitting oil to bypass the oil filter element through the disc element;

a normally closed check valve positioned within said bypass passage means and having an upstream side in fluid communication with said first disc passage means and a downstream side in fluid communication with said second disc passage means, said check valve being operative to open in response to a predetermined pressure buildup within said first disc passage means;

means for detecting the opening of said check valve such as when a clogged filter element produces a predetermined pressure buildup upstream of said check valve;

warning signal means operably connected to said means for detecting the opening of said check valve; and an electrical circuit including a transistor switch including a common ground transistor wherein the base of said transistor is connected to a ground potential through said check valve means.

2. In an oil filter system as defined in claim 1 wherein said check valve comprises:
a hollow cylindrical valve guide,
a valve seat positioned at one end of said valve guide,
a valve body dimensioned to intimately slide within said valve seat, and
porting means extending through said valve guide downstream of said valve seat for permitting oil to flow through said check valve when said valve body moves away from said valve seat in response to said sensing of a predetermined pressure buildup within said first disc passage.

3. In an oil filter system as defined in claim 2 wherein said means for detecting the opening of said check valve comprises:
a dielectric isolation member coaxially mounted with respect to said check valve means within said disc element; and
contact means extending within said dielectric isolation member and being biased into electrical contact with the upstream side of said check valve means.

4. In an oil filter system as defined in claim 3 wherein:
an interior ledge is formed within said dielectric isolation member; and
an exterior ledge is formed on said contact means and being axially dimensioned such that said contact means will operably follow the opening of said valve body until said valve body exposes said porting means and oil begins to bypass the oil filter.

5. In an oil filter system as defined in claim 1 wherein: said disc element comprises a generally cylindrical member wherein the height less than the diameter thereof and said second disc passage means comprises a central axial bore extending through said cylindrical disc element.

6. In an oil filter system as defined in claim 5 wherein:
said central axial bore is threaded and operable to be engaged at one end with a threaded member for coupling the disc element to the machine and at the other end to a threaded member for coupling the disc element to the oil filter.

7. In an oil filter system as defined in claim 6 wherein:
said first disc passage means comprises a plurality of bores extending in a mutually parallel posture with respect to said axial bore and being peripherally spaced about said axial bore for passing oil to be filtered from the machine into the oil filter cannister.

8. In an oil filter system as defined in claim 6 wherein:
said bypass passage means comprises at least one bore extending within said disc element generally transversely with respect to said central axial bore and said plurality of bores extending parallel with said central axial bore.

9. An oil filter system as defined in claim 7 wherein said means for detecting the opening of said check valve comprises:
a dielectric isolation member coaxially mounted with respect to said check valve means within said disc element; and
contact means extending within said dielectric isolation member and being biased into electrical contact with the upstream side of said check valve means.

10. In an oil filter system as defined in claim 9 wherein:
an interior ledge is formed within said dielectric isolation member; and
an exterior ledge is formed on said contact means and being axially dimensioned such that said contact means will operably follow the opening of said valve body until said valve body exposes said porting means and oil begins to bypass the oil filter.

11. In an oil filter system as defined in claim 7, 9 or 10 wherein said check valve comprises:
a hollow cylindrical valve guide,
a valve seat positioned at one end of said valve guide,
a valve body dimensioned to intimately slide within said valve guide,
a spring for biasing said valve body against said valve seat, and
porting means extending through said valve guide axially downstream of said valve seat for permitting oil to flow through said check valve when said valve body moves away from said valve seat in response to predetermined pressure buildup within said first disc passage.

* * * * *